(12) United States Patent
Kasher et al.

(10) Patent No.: US 10,523,295 B2
(45) Date of Patent: Dec. 31, 2019

(54) SPLIT BEAMFORMING REFINEMENT PHASE (BRP) BASED SECTOR LEVEL SWEEP (SLS) FOR MULTI-ANTENNA ARRAY DEVICES

(71) Applicant: QUALCOMM Incorporated, San Diego, CA (US)

(72) Inventors: Assaf Yaakov Kasher, Haifa (IL); Amichai Sanderovich, Atlit (IL); Solomon Trainin, Haifa (IL); Alecsander Petru Eitan, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/906,071

(22) Filed: Feb. 27, 2018

(65) Prior Publication Data
US 2018/0248603 A1  Aug. 30, 2018

Related U.S. Application Data

(60) Provisional application No. 62/465,147, filed on Feb. 28, 2017.

(51) Int. Cl.
*H04B 7/06* (2006.01)
*H04B 7/0456* (2017.01)
(Continued)

(52) U.S. Cl.
CPC ......... *H04B 7/0617* (2013.01); *H04B 7/0469* (2013.01); *H04B 7/063* (2013.01);
(Continued)

(58) Field of Classification Search
CPC .... H04B 7/0617; H04B 7/0695; H04B 7/088; H04B 7/0408; H04B 7/0452; H04B 7/0632; H04B 7/0619; H04W 72/046
(Continued)

(56) References Cited

U.S. PATENT DOCUMENTS 8,982,803 B1 * 3/2015 Zhang ................. H04B 7/0619
370/329
2015/0244432 A1 8/2015 Wang

OTHER PUBLICATIONS

Cordeiro C., et al., "MU MIMO Beamforming Protocol Proposal; 11-16-1365-00-00ay-mu-mimo-beamforming-protocolproposal", IEEE Draft; 11-16-1365-00-00AY-MU-MIMOBEAMFORMING-PROTOCOL-PROPOSAL, IEEE-SA Mentor, Piscataway, NJ USA, vol. 802.11ay, Nov. 8, 2016 (Nov. 8, 2016), pp. 1-23, XP068110735.

(Continued)

*Primary Examiner* — Leila Malek
(74) *Attorney, Agent, or Firm* — Steven R. Thiel; Patterson & Sheridan LLP

(57) ABSTRACT

Certain aspects of the present disclosure provide methods and apparatus for enhancing a beamforming training procedure. For example, an apparatus can include a processing system that generates a plurality of transmit beamforming refinement frames for a transmit sector sweep that each include a preamble, a data field, at least one beamforming training field, identification of a transmit antenna array to be used for transmitting the at least one beamforming training field, and a status indication of whether the transmit beamforming refinement frame is a last transmit beamforming refinement frame in the transmit sector sweep for one or more receive antenna arrays of a wireless node. The apparatus also includes a first interface that outputs the transmit beamforming refinement frames using a first transmit beamforming sector for the preambles and data fields, and one or more second transmit beamforming sectors for subfields of the beamforming training fields.

16 Claims, 15 Drawing Sheets

(51) Int. Cl.
*H04B 7/08* (2006.01)
*H04W 72/04* (2009.01)

(52) U.S. Cl.
CPC ......... *H04B 7/0621* (2013.01); *H04B 7/0695* (2013.01); *H04B 7/088* (2013.01); *H04W 72/046* (2013.01)

(58) Field of Classification Search
USPC .......................................................... 375/267
See application file for complete search history.

(56) References Cited

OTHER PUBLICATIONS

"ISO/IEC/IEEE International Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications Amendment 3: Enhancements", IEEE Standard, IEEE, Piscataway, NJ, USA, Mar. 14, 2014 (Mar. 14, 2014), pp. 1-634, XP068070330, ISBN: 978-0-7381-9032-7.

Partial International Search Report—PCT/US2018/020138—ISA/EPO—dated Jun. 12, 2018.

Silva C.D., et al., "BRP Transmit Sector Sweep", IEEE Draft; 11-17-0322-00-00AY-BRP-TRANSMIT-SECTOR-SWEEP, IEEE-SA, Mentor, Piscataway, NJ, USA, vol. 802.11ay, Mar. 11, 2017 (Mar. 11, 2017), pp. 1-15, XP068115343, Retrieved from the Internet: URL: https://mentor.ieee.org/802.11/dcn/17/11-17-0322-00-00ay-brp-transmit-sector-sweep.pptx [retrieved on Mar. 11, 2017] the whole document.

International Search Report and Written Opinion—PCT/US2018/020138—ISA/EPO—dated Aug. 8, 2018.

\* cited by examiner

1000A

1002A

MEANS FOR GENERATING A PLURALITY OF TRANSMIT BEAMFORMING REFINEMENT FRAMES FOR A TRANSMIT SECTOR SWEEP, EACH TRANSMIT BEAMFORMING REFINEMENT FRAME INCLUDING A PREAMBLE, A DATA FIELD, AT LEAST ONE BEAMFORMING TRAINING FIELD, IDENTIFICATION OF A TRANSMIT ANTENNA ARRAY TO BE USED FOR TRANSMITTING THE AT LEAST ONE BEAMFORMING TRAINING FIELD, AND A STATUS INDICATION OF WHETHER THE TRANSMIT BEAMFORMING REFINEMENT FRAME IS A LAST TRANSMIT BEAMFORMING REFINEMENT FRAME IN THE TRANSMIT SECTOR SWEEP FOR ONE OR MORE RECEIVE ANTENNA ARRAYS OF A WIRELESS NODE

1004A

MEANS FOR OUTPUTTING THE TRANSMIT BEAMFORMING REFINEMENT FRAMES FOR TRANSMISSION (E.G., USING A FIRST TRANSMIT BEAMFORMING SECTOR FOR THE PREAMBLES AND DATA FIELDS, AND ONE OR MORE SECOND TRANSMIT BEAMFORMING SECTORS FOR SUBFIELDS OF THE BEAMFORMING TRAINING FIELDS)

FIG. 10A

SPLIT BEAMFORMING REFINEMENT PHASE (BRP) BASED SECTOR LEVEL SWEEP (SLS) FOR MULTI-ANTENNA ARRAY DEVICES

CLAIM OF PRIORITY UNDER 35 U.S.C. § 119

The present Application for patent claims benefit of U.S. Provisional Patent Application Ser. No. 62/465,147, filed Feb. 28, 2017, assigned to the assignee hereof and hereby expressly incorporated by reference herein.

BACKGROUND

Field of the Disclosure

Certain aspects of the present disclosure generally relate to wireless communications and, more particularly, to enhancing a beamforming training procedure.

Description of Related Art

In order to address the issue of increasing bandwidth requirements demanded for wireless communications systems, different schemes are being developed to allow multiple user terminals to communicate with a single access point by sharing the channel resources while achieving high data throughputs.

Certain applications, such as virtual reality (VR) and augmented reality (AR) may demand data rates in the range of several Gigabits per second. Certain wireless communications standards, such as the Institute of Electrical and Electronics Engineers (IEEE) 802.11 standard. The IEEE 802.11 standard denotes a set of Wireless Local Area Network (WLAN) air interface standards developed by the IEEE 802.11 committee for short-range communications (e.g., tens of meters to a few hundred meters).

Amendment 802.11ad to the WLAN standard defines the MAC and PHY layers for very high throughput (VHT) in the 60 GHz range. Operations in the 60 GHz band allow the use of smaller antennas as compared to lower frequencies. However, as compared to operating in lower frequencies, radio waves around the 60 GHz band have high atmospheric attenuation and are subject to higher levels of absorption by atmospheric gases, rain, objects, and the like, resulting in higher free space loss. The higher free space loss can be compensated for by using many small antennas, for example arranged in a phased array.

Using a phased array, multiple antennas may be coordinated to form a coherent beam traveling in a desired direction (or beam), referred to as beamforming. An electrical field may be rotated to change this direction. The resulting transmission is polarized based on the electrical field. A receiver may also include antennas which can adapt to match or adapt to changing transmission polarity.

The procedure to adapt the transmit and receive antennas, referred to as beamforming training, may be performed initially to establish a link between devices and may also be performed periodically to maintain a quality link using the best transmit and receive beams. However, beamforming training represents a significant amount of overhead, as the training time reduces data throughput. The amount of training time increases as the number of transmit and receive antennas increase, resulting in more beams to evaluate during training.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide an apparatus for wireless communications. The apparatus generally includes a processing system configured to generate a plurality of transmit beamforming refinement frames for a transmit sector sweep, each transmit beamforming refinement frame comprising a preamble, a data field, at least one beamforming training field, identification of a transmit antenna array to be used for transmitting the at least one beamforming training field, and a status indication of whether the transmit beamforming refinement frame is a last transmit beamforming refinement frame in the transmit sector sweep for one or more receive antenna arrays of a wireless node, and a first interface configured to output the transmit beamforming refinement frames for transmission, each transmit beamforming refinement frame output for transmission using a first transmit beamforming sector for the preambles and data fields, and one or more second transmit beamforming sectors for subfields of the beamforming training fields.

Certain aspects of the present disclosure provide an apparatus for wireless communications. The apparatus generally includes a first interface configured to obtain a plurality of transmit beamforming refinement frames during a sector sweep, wherein a first portion of each transmit beamforming refinement frame is obtained via a first receive beamforming sector, subfields of a training field of the transmit beamforming refinement frames are obtained while the apparatus is in an omnidirectional receive antenna mode, each transmit beamforming refinement frame has an identification of a transmit antenna array used by a wireless node for transmitting the at least one beamforming training field, and a status indication of whether the transmit beamforming refinement frame is a last transmit beamforming refinement frame in the transmit sector sweep for one or more receive antenna arrays, and a processing system. The processing system is configured to determine the sector sweep for at least one of the receive antenna arrays is over based on the status indication contained therein and, in response to the determination, select one or more first transmit beamforming sectors that was used to transmit one of the training field subfields, based on received signal quality of the one of the training field subfields, and generate a feedback frame identifying one or more one of the selected first transmit beamforming sectors, one of the identified transmit antenna arrays of the wireless node, and one of the receive antenna arrays. The apparatus also includes a second interface configured to output the feedback frame for transmission.

Aspects of the present disclosure generally include methods, apparatus, systems, computer readable mediums, and processing systems, as substantially described herein with reference to and as illustrated by the accompanying drawings. Numerous other aspects are provided.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 10A illustrates example components capable of performing the operations shown in FIG. 10.

To facilitate understanding, identical reference numerals have been used, where possible, to designate identical elements that are common to the figures. It is contemplated that elements described in one aspect may be beneficially utilized on other aspects without specific recitation.

DETAILED DESCRIPTION

Figure 1:
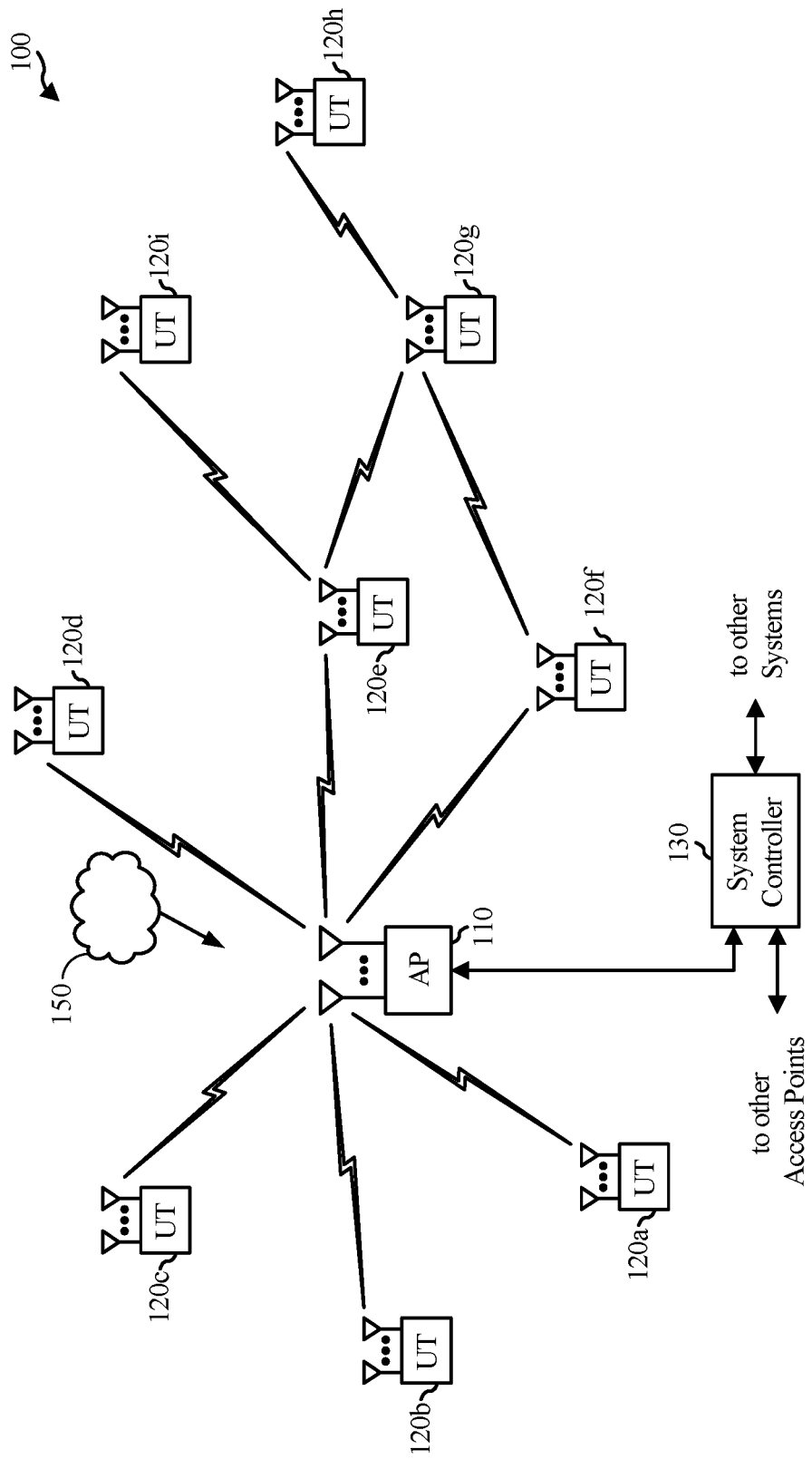
FIG. 1 is a diagram of an example wireless communications network, in accordance with certain aspects of the present disclosure.

Certain aspects of the present disclosure provide methods and apparatus for enhancing a beamforming training procedure for multi-antenna array devices.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure described herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure described herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC- FDMA. The techniques described herein may be utilized in any type of applied to Single Carrier (SC) and SC-MIMO systems.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an access point (AP) 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
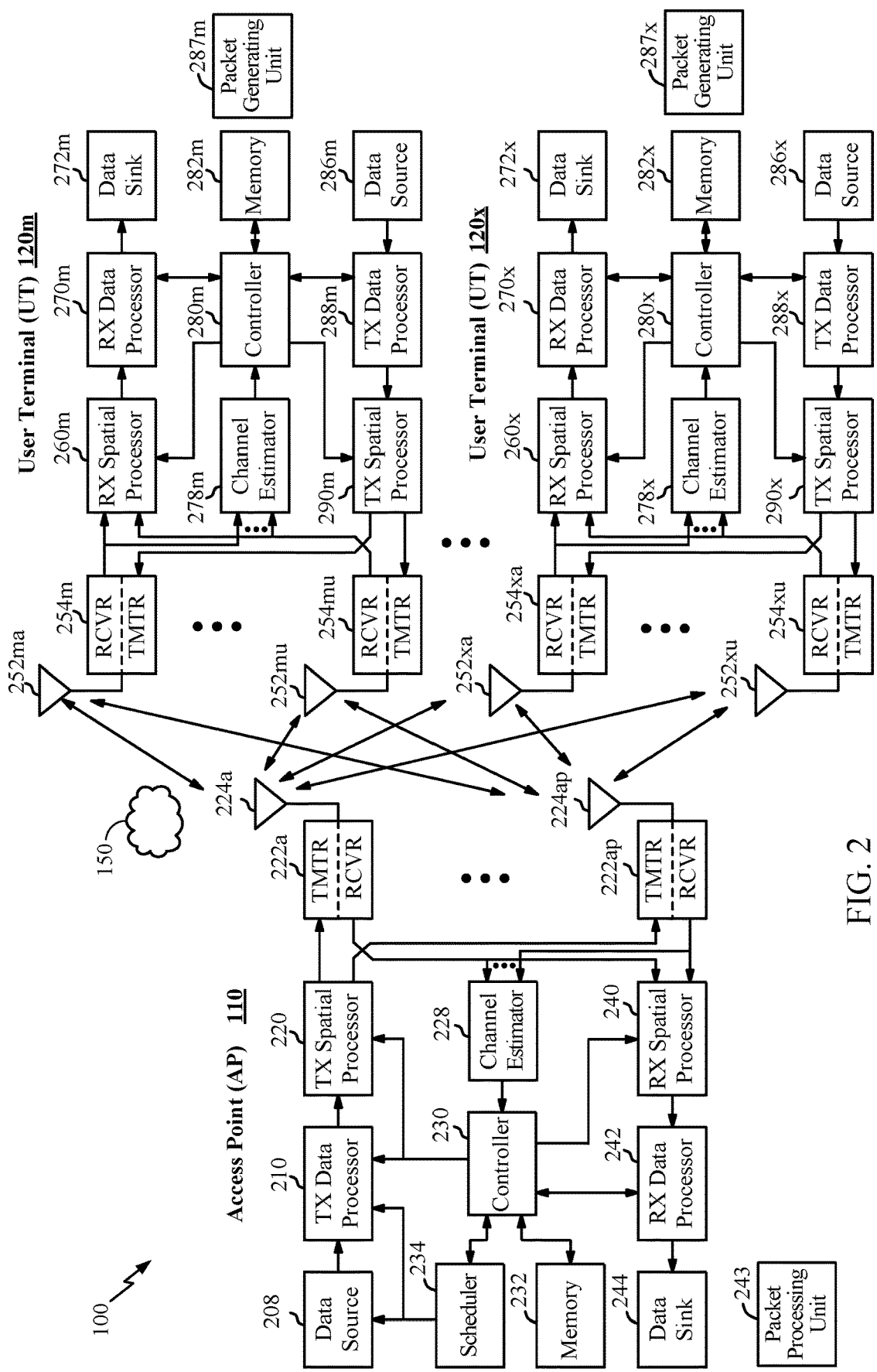
FIG. 2 is a block diagram of an example access point and example user terminals, in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. The term communication generally refers to transmitting, receiving, or both. In the following description, the subscript "dn" denotes the downlink, the subscript "up" denotes the uplink, Nup user terminals are selected for simultaneous transmission on the uplink, Ndn user terminals are selected for simultaneous transmission on the downlink, Nup may or may not be equal to Ndn, and Nup and Ndn may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

Nup user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all Nup user terminals transmitting on the uplink. Each antenna 224 provides a received signal to a respective receiver unit (RCVR) a transceiver 222. While transceivers are shown in this example, in some cases, separate receiver units and transmitter units may be provided. Each receiver unit of each transceiver 222 performs processing complementary to that performed by transmitter unit 254 and provides a received symbol stream. An RX spatial processor 240 performs receiver spatial processing on the $N_{ap}$ received symbol streams from $N_{ap}$ receiver units of the transceivers 222 and provides Nup recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for Ndn user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides Ndn downlink data symbol streams for the Ndn user terminals. A TX spatial processor 220 performs spatial processing (such as a precoding or beamforming, as described in the present disclosure) on the Ndn downlink data symbol streams, and provides $N_{ap}$ transmit symbol streams for the $N_{ap}$ antennas. Each transmitter unit of each transceiver 222 receives and processes a respective transmit symbol stream to generate a downlink signal. $N_{ap}$ transmitter units of the transceivers 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

As illustrated, in FIGS. 1 and 2, one or more user terminals 120 may send one or more packets 150, with a preamble format as described herein (e.g., in accordance with one of the example formats shown in FIGS. 3A-3B). Each packet 150 may be transmitted on a set of one or more spatial streams (e.g., up to 4). For certain aspects, the preamble portion of the packet 150 may include tone-interleaved LTFs, subband-based LTFs, or hybrid LTFs (e.g., in accordance with one of the example implementations).

The packet 150 may be generated by a packet generating unit 287 at the user terminal 120. The packet generating unit 287 may be implemented in the processing system of the user terminal 120, such as in the TX data processor 288, the controller 280, and/or the data source 286.

After UL transmission, the packet 150 may be processed (e.g., decoded and interpreted) by a packet processing unit 243 at the access point 110. The packet processing unit 243 may be implemented in the process system of the access point 110, such as in the RX spatial processor 240, the RX data processor 242, or the controller 230. The packet processing unit 243 may process received packets differently, based on the packet type (e.g., with which amendment to the IEEE 802.11 standard the received packet complies). For example, the packet processing unit 243 may process a packet 150 based on the IEEE 802.11 standard, but may interpret a legacy packet (e.g., a packet complying with IEEE 802.11a/b/g) in a different manner, according to the standards amendment associated therewith.

Certain standards, such as the IEEE 802.11ay standard currently in the development phase, extend wireless communications to include features such as channel bonding and MIMO into the 60 GHz band. Example features to be included in such standards include channel aggregation and Channel-Bonding (CB). In general, channel aggregation utilizes multiple channels that are kept separate, while channel bonding treats the bandwidth of multiple channels as a single (wideband) channel.

As described above, operations in the 60 GHz band may allow the use of smaller antennas as compared to lower frequencies. While radio waves around the 60 GHz band have relatively high atmospheric attenuation, the higher free space loss can be compensated for by using many small antennas, for example arranged in a phased array.

Using a phased array, multiple antennas may be coordinated to form a coherent beam traveling in a desired direction. An electrical field may be rotated to change this direction. The resulting transmission is polarized based on the electrical field. A receiver may also include antennas which can adapt to match or adapt to changing transmission polarity.

Figure 3:
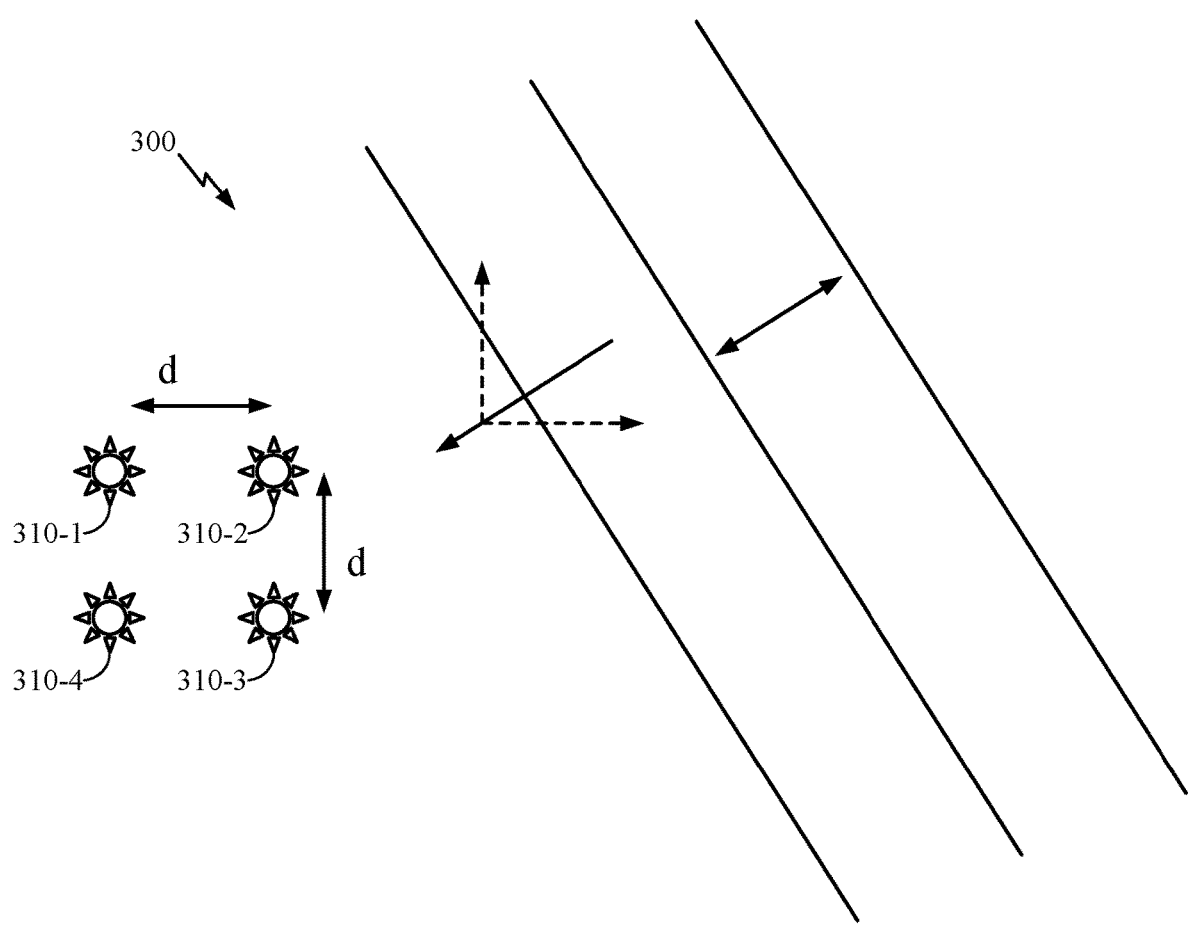
FIG. 3 is a diagram illustrating signal propagation in an implementation of phased-array antennas, in accordance with certain aspects of the present disclosure.

FIG. 3 is a diagram illustrating signal propagation 300 in an implementation of phased-array antennas. Phased array antennas use identical elements 310-1 through 310-4 (hereinafter referred to individually as an element 310 or collectively as elements 310). The direction in which the signal is propagated yields approximately identical gain for each element 310, while the phases of the elements 310 are different. Signals received by the elements are combined into a coherent beam with the correct gain in the desired direction.

Example Beamforming Training Procedure

In high frequency (e.g., mmWave) communication systems like 60 GHz (e.g., 802.11ad and 802.11ay), communication may rely on beamforming (BF), using phased arrays on both sides for achieving good link quality. As described above, beamforming (BF) generally refers to a mechanism used by a pair of STAs to adjust transmit and/or receive antenna settings to achieve a desired link budget for subsequent communication.

Figure 4:
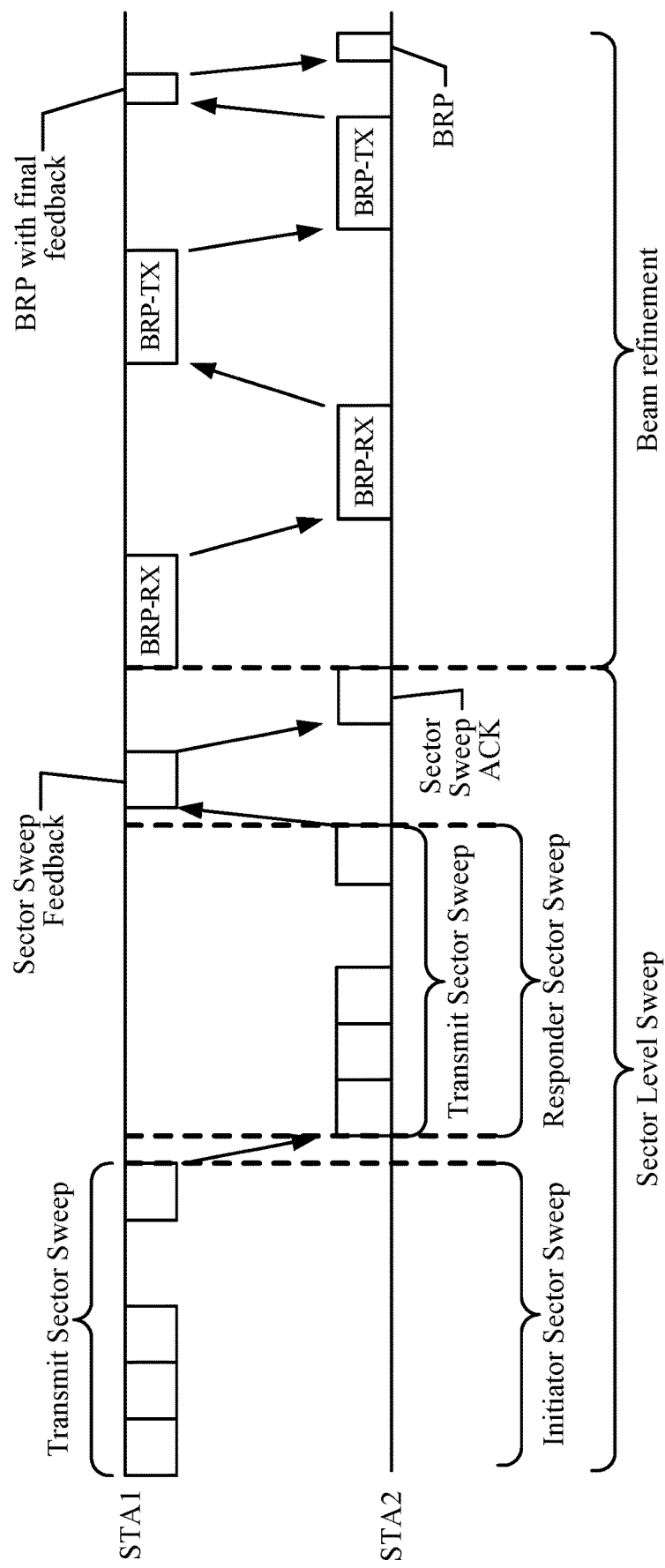
FIG. 4 illustrates an example beamforming training procedure.

As illustrated in FIG. 4, BF training typically involves a bidirectional sequence of BF training frame transmissions between stations (STA1 and STA2 in this example) that uses a sector sweep followed by a beam refining phase (BRP). For example, an AP or non-AP STA may initiate such a procedure to establish an initial link. During the sector sweep, each transmission may be sent using a different sector (covering a directional beam of a certain width) identified in the frame and each transmission may provide the necessary signaling to allow each STA to determine appropriate antenna system settings for both transmission and reception.

In cases where the STAs have a large number of antenna elements, the sectors used are relatively narrow, causing the SLS (Sector Level Sweep) process to be long. The higher the directivity, the more sectors needed and, therefore, duration of the SLS is longer. As an example, a STA with an array of 100 antenna elements may use 100 sectors. The lengthy SLS procedure may interrupt data transmissions, which may have an impact on throughput, power consumption and induces a gap in the transport flow.

Various techniques may be used to try and reduce SLS duration. For example, short SSW (SSSW) messages may be used instead of conventional SSW messages, which may save some time (e.g., about 36%). In some cases, throughput may be improved by utilizing the fact that in such APs the transmitter may transmit via several RF chains. This technique may facilitate transmission in parallel on several single channels. This technique may also shorten the scan by a factor number of frequencies (2, 3, or 4). However, this approach may involve the receiver supporting scans of the multiple frequencies, and the approach may not be backward compatible with, for example, 802.11ad devices. This approach may further involve the stations being fully aware of this special mode in advance. In some cases, the Tx SLS+Rx SLS or the Tx SLS+Rx BRP may be replaced with a new Tx+Rx BRP where one "very" long BRP message may be used with many TRN units. This method may involve a very long message, but may be able to support multiple STAs in parallel, making it efficient but only in cases with a large number of STAs.

Figure 5:
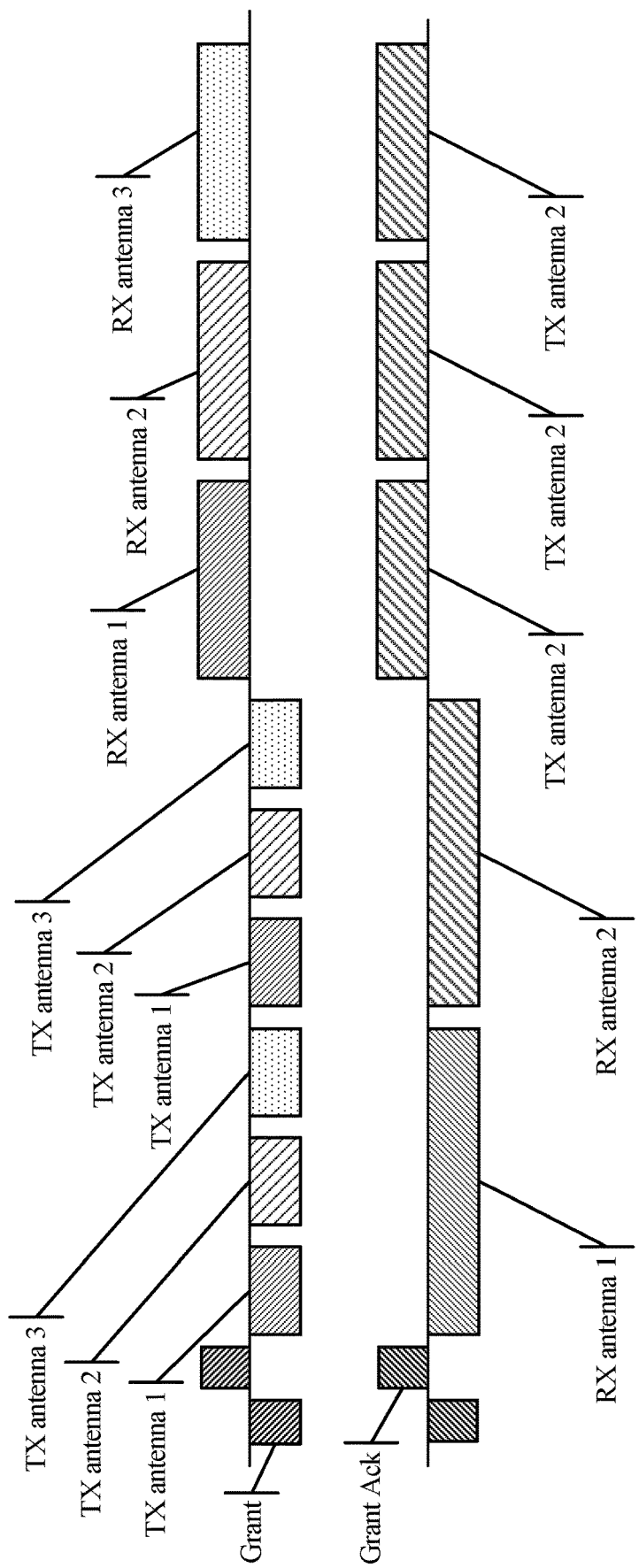
FIG. 5 illustrates an example beamforming training procedure.

FIG. 5 illustrates an example beamforming training procedure using multiple antennas. In this example, FIG. 5 illustrates sector based multi-antenna SLS using an initiator with at least three transmission/transmitter (Tx) antennas and three reception/receiver (Rx) antennas and a responder that includes at least two Rx antennas and Tx antennas. As illustrated, an initiator may perform a full transmit sector sweep from all the initiator antennas (transmit antenna arrays) and repeat the sweep for all of the responders antennas (receive antenna arrays). Subsequently, the responder may perform a sector sweep using the best transmit antenna array (e.g., assuming reciprocity, the best receive antenna array) and repeat the sector sweep for each of the initiator receive antenna arrays.

Figure 6:
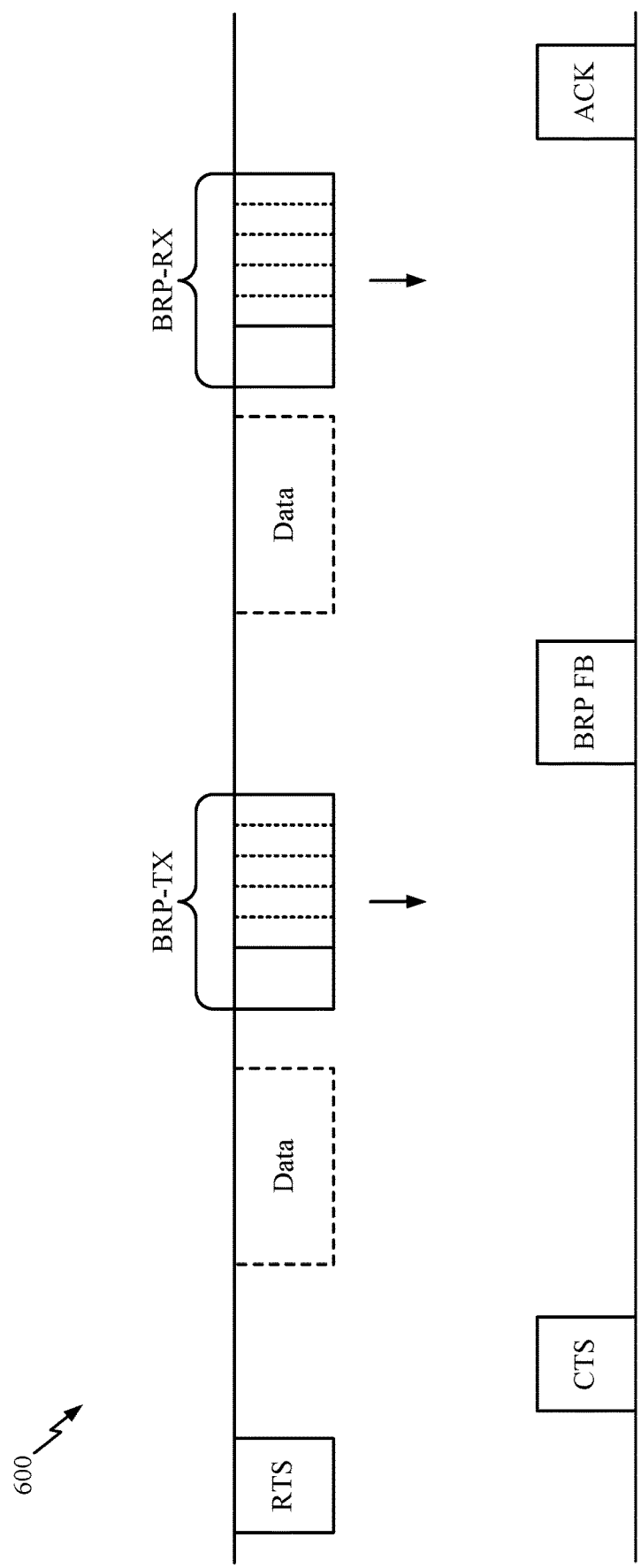
FIG. 6 illustrates an example beamforming training procedure and data transmissions.

Unfortunately, when each device has several phased array antennas, as in the example of FIG. 5, beamforming training takes a significant amount of time and may interrupt data traffic. FIG. 6 illustrates an example of "split" BRP based SLS to determine best sectors. The different sectors to be swept are "split" over multiple BRP frames, which may help cut down the interruption between data packets. Aspects of the present disclosure may extend the concept of split BRP based SLS to multi-antenna applications.

Figure 7:
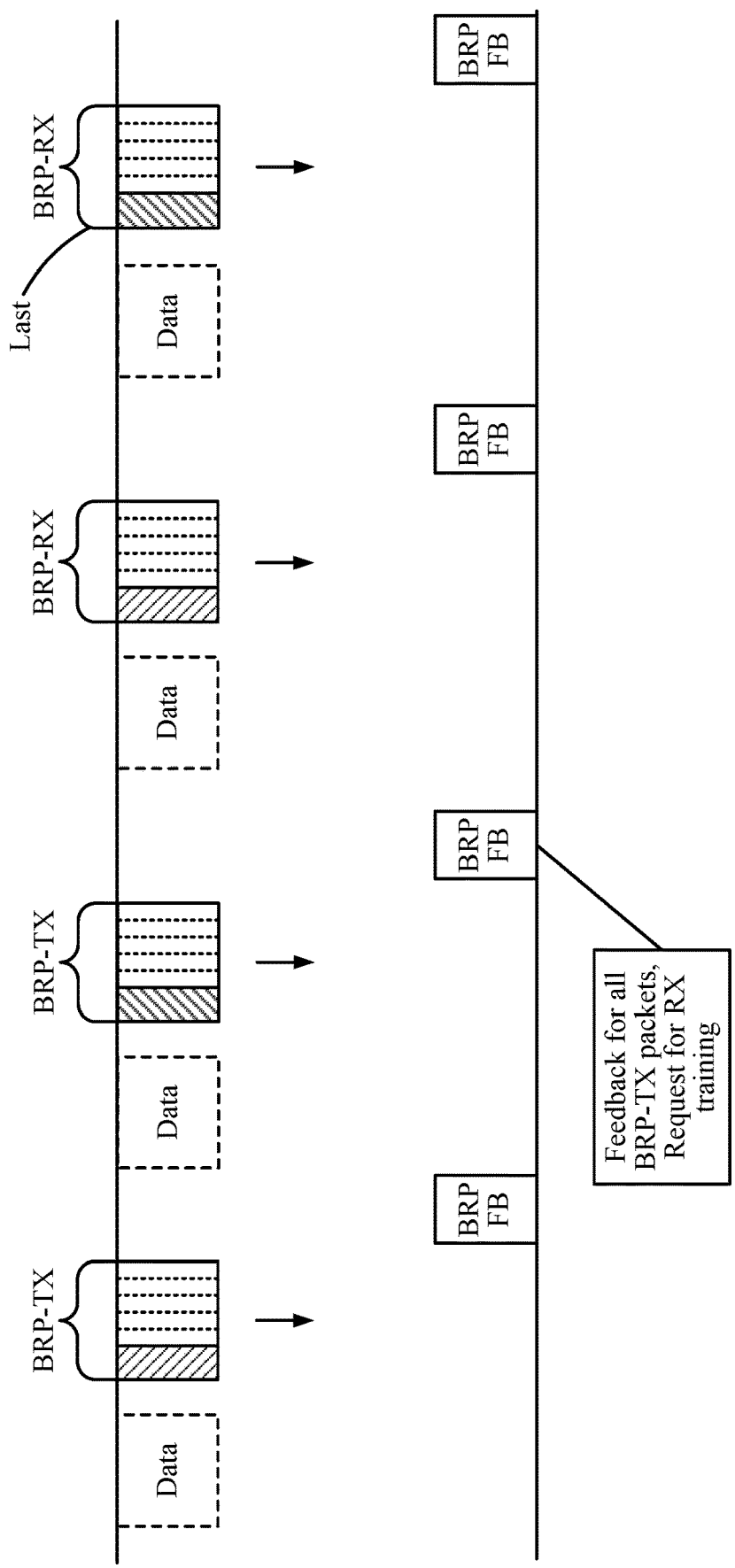
FIG. 7 illustrates an example beamforming training procedure.

FIG. 7 illustrates how SLS status may be provided in BRP frames. For example, each BRP frame may have an indication whether the BRP frame starts an SLS procedure, continues an SLS procedure or is the last BRP frame in the SLS procedure. Based on the indication, a responder may know when the SLS procedure is over and, for example, provide feedback accordingly. While not shown, the reciprocal link (from the responder to the initiator) may be trained in a similar manner. Once training is complete, the antenna weight vector (AWV) used for Tx and Rx of data on the trained link are switched after the last Rx feedback (FB).

Example Beamforming Training for Multiple Antenna Arrays

Aspects of the present disclosure allow a split BRP-based SLS procedure, such as the procedure described above, to be extended to beamforming training between an initiator and responder with multiple transmitter and/or receive antenna arrays. By providing an indication that an SLS procedure will be for multiple antennas (or antenna arrays), and by providing an indication of a particular transmit antenna (or antenna array) used to transmit training fields, a responder may be able to provide feedback for multiple BRP frames sent using different transmit antenna arrays (and received using different receive antenna arrays).

As noted above, due to the high frequency used in 60 GHz communication, high gain phased array antennas may be used to achieve reasonable ranges. Further, to get these high gain antennas to "point" in the right direction (for transmissions and/or reception) a beamforming training algorithms may be implemented.

In some cases, devices have several antennas and/or arrays that cannot be used simultaneously, in both TX and RX. In such cases, beamforming training algorithms based on TX sector sweep training for devices with several antenna arrays that are used are very long (e.g., for the case that the arrays include 256/128 elements). Additionally, various use cases, such as Virtual Reality/Augmented Reality (VR/AR), may involve frequent beamforming training. Therefore, in order to enable fast and frequent training, BRP packets may be used, which are packets with TRN fields that help perform the training. However, these BRP sequences may still be very long and may stop data transmission for long periods of times. Accordingly, one or more cases may be provided that include splitting of the SLS into smaller parts that may allow for transmitting data between them.

Certain aspects of the present disclosure provide techniques that may help support multiple antenna arrays while also providing enhanced beamforming training and refinement. For example, the techniques presented herein may help support multiple antennas arrays and may also help reduce time used for beamforming training to maintain a high link quality, which may be particularly important in certain applications. For example, certain applications like VR/AR typically demand high gain beam links at each data transaction. Periodic beamforming at each link access may be used to meet this demand. Unfortunately, these applications are also very sensitive to latency, which means beamforming training latency may present a challenge, particularly for devices with multiple receive and/or transmit antenna arrays.

Figure 8:
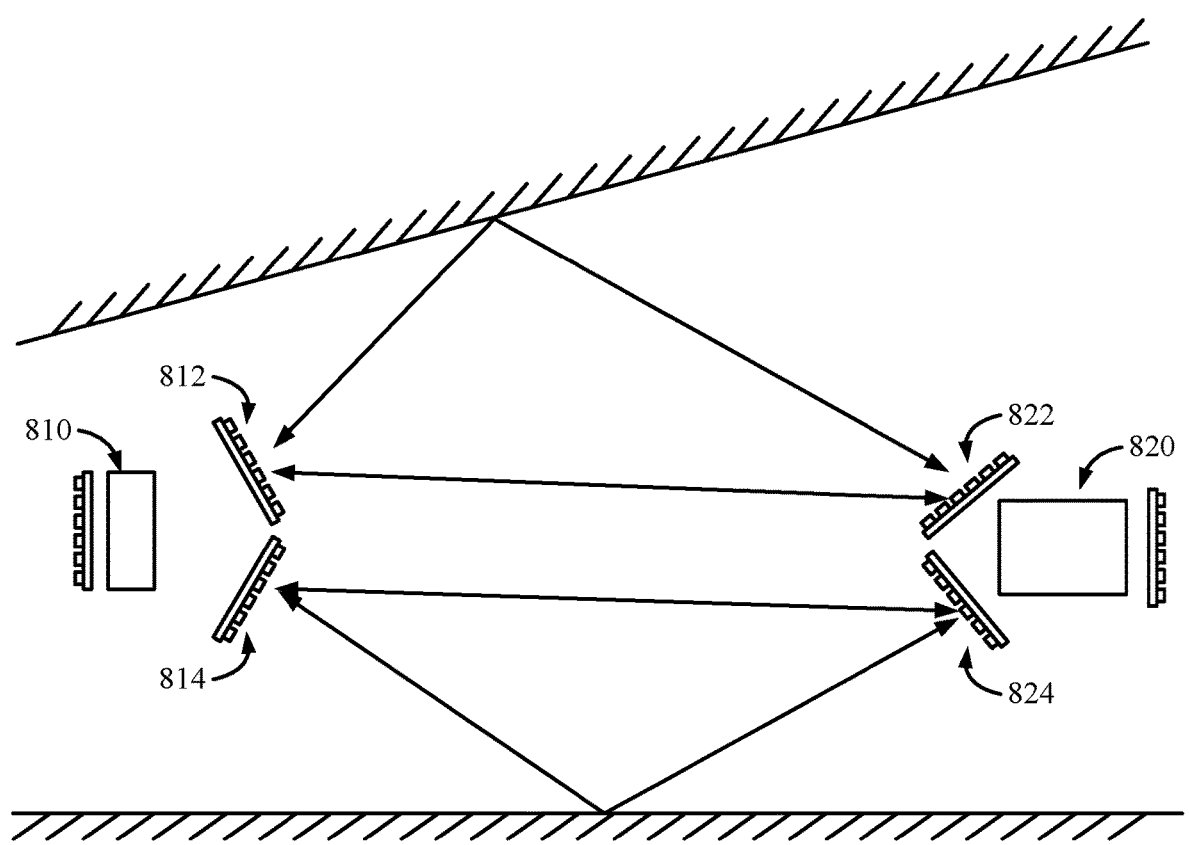
FIG. 8 illustrates devices with multiple antenna arrays which may perform beamforming training, in accordance with aspects of the present disclosure.

For example, FIG. 8 illustrates devices 810 and 820 with multiple antenna arrays 812, 814, 822, and 824 that may perform beamforming training, in accordance with one or more aspects of the present disclosure. As show a first device 810 may include a plurality of antenna arrays 812 and 814 each of which may comprise a plurality of antennas. Similarly a second device 820 is shown that may include a plurality of antenna arrays 822 and 824 each of which may comprise a plurality of antennas.

FIG. 8 how devices placed within signal range of each other may have multiple paths for signals transmitted from and received by antenna arrays 812, 814, 822, and 824. For example, as shown signals may be transmitted and received along a direct path between the different antenna arrays. Indirect paths are also shown, where signal transmissions bounce off surfaces and reflect back such that corresponding antenna arrays may receive them. Some paths may also be obstructed by, for example, an object being placed between the devices or a rotation or movement of one of the devise to new location or position. Further, it can also be appreciated that a similar object placement and/or device movement may provide additional transmission paths as well as may provide transmission paths to an array that previously had none.

In accordance with one or more aspects, of the multiple antenna arrays on any given device, one array may operate at a time at both TX and RX. Further, it can be appreciated that switching between antenna arrays may take significant time from a packet and interframe spaces proportions perspective. For example, a standard amount of transition time that may be taken can be 15 usec with some devices using less. During the transition time there may be no transmissions or those transmissions that are made may be indecipherable. Further, during this transition time between RX antennas the device may be considered to be blind.

Figure 9:
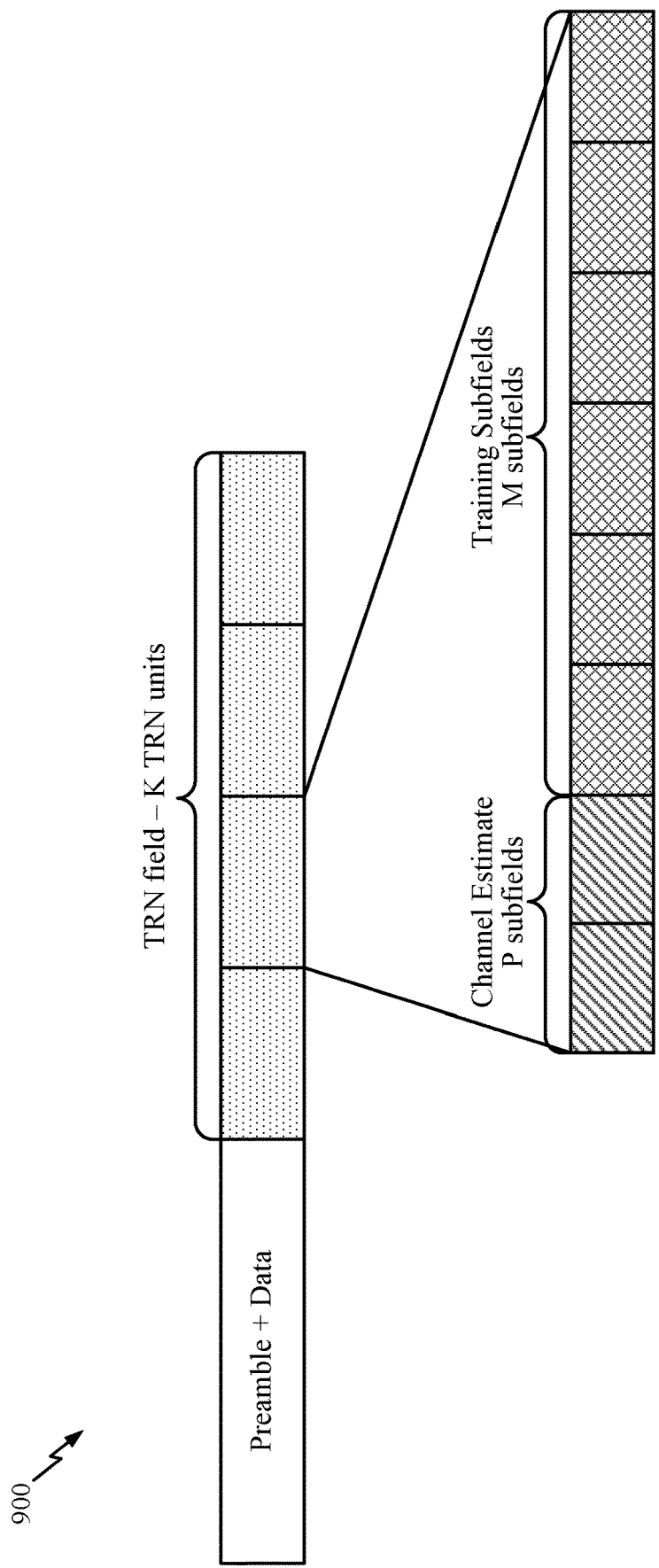
FIG. 9 illustrates an example beamforming refinement phase (BRP) frame, in accordance with aspects of the present disclosure.

As shown in FIG. 9, a BRP frame 900 may have a preamble and data portion transmitted using one transmit sector, followed by a training field with different (e.g. 'K') training subfields or "TRN units." Any one of these units may comprise one or more channel estimate 'P' subfields and one or more training 'M' subfields. For a transmit SLS procedure, each TRN unit may be transmitted using a different transmit beamforming sector. As noted above, according to a split BRP based SLS procedure, the total sectors for a sweep may be divided across many different BRP frames, allowing relatively low latency between data transmissions.

According to one or more aspects, implementing a split BRP multi-antenna SLS as described herein may provide one or more features and/or advantages. For example, implementing a sweep procedure as provided in accordance with to one or more aspects described here may provide a procedure for finding the best transmit and receive (Tx/Rx) antenna and sector pairs. Further, implementing the split BRP multi-antenna SLS sweep procedure may provide a procedure for finding a set of Tx/Rx antenna and sector pairs for backup configuration as well.

In some cases, antenna reciprocity may be such that the best Tx antenna array may also the best Rx antenna Array. Further, in some cases, the same antenna arrays may be used for Tx and Rx transmission.

Figure 10:
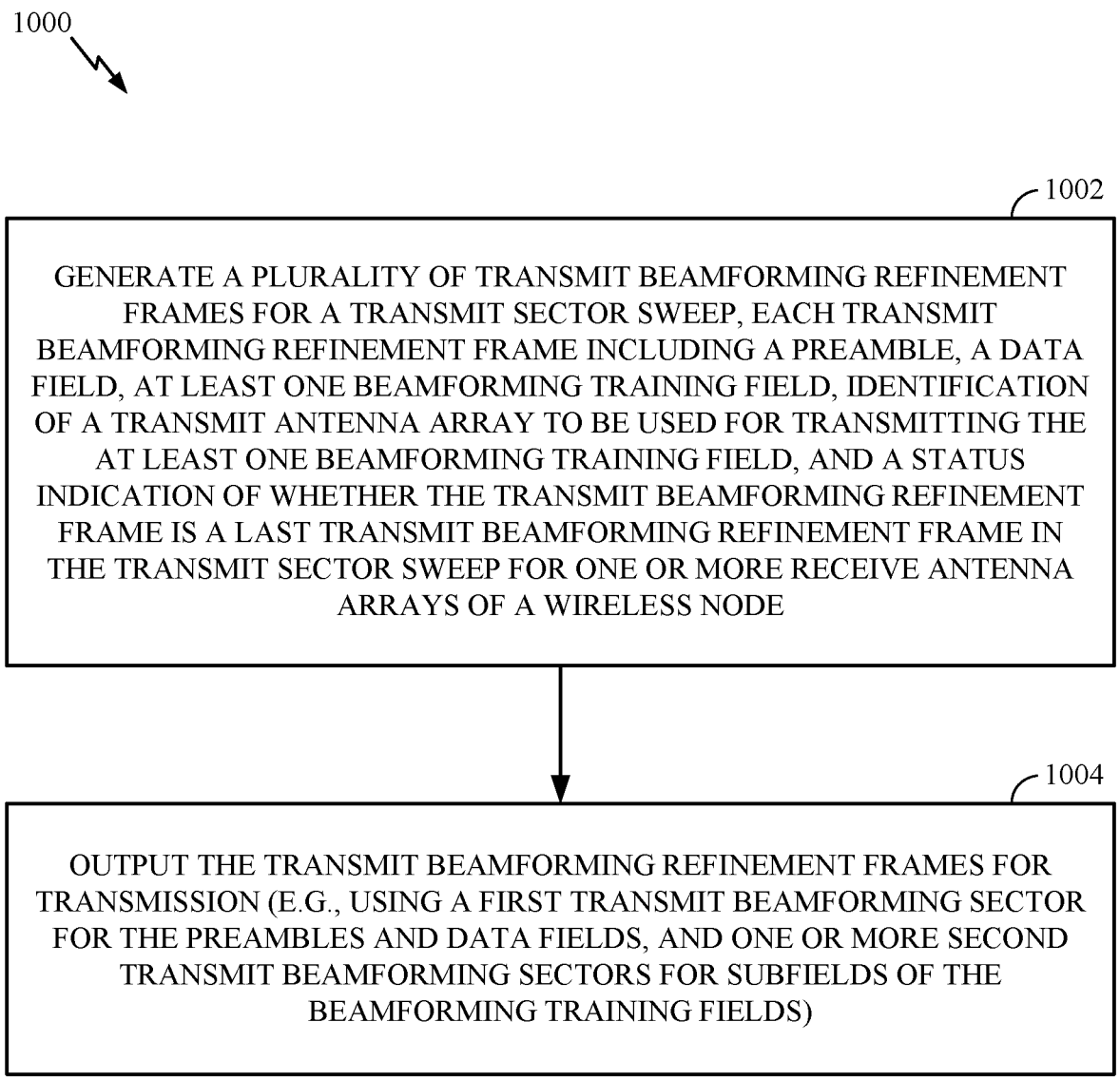
FIG. 10 illustrates example operations for performing beamforming training by an initiator, in accordance with certain aspects of the present disclosure.

FIG. 10 illustrates example operations 1000 for performing beamforming training by an initiator, in accordance with certain aspects of the present disclosure. For example, operations 1000 may be performed by an AP or non-AP STA initiating a BRP.

The operations 1000 begin, at 1002, by generating a plurality of transmit beamforming refinement frames for a transmit sector sweep, each transmit beamforming refinement frame including a preamble, a data field, at least one beamforming training field, identification of a transmit antenna array to be used for transmitting the at least one beamforming training field, and a status indication of whether the transmit beamforming refinement frame is a last transmit beamforming refinement frame in the transmit sector sweep for one or more receive antenna arrays of a wireless node. At 1004, the transmit beamforming refinement frames are output for transmission (e.g., using a first transmit beamforming sector for the preambles and data fields, and one or more second transmit beamforming sectors for subfields of the beamforming training fields).

In some cases, the initiator may obtain at least one feedback frame from the wireless node, after the last transmit beamforming refinement frame in the sector sweep for at least one of the receive antenna arrays of the wireless node was output for transmission. The at least one feedback frame may identify one or more transmit beamforming sectors that were used for transmitting beamforming training fields of the transmit beamforming refinement frames and, for each of the identified transmit beamforming sectors, one of the identified transmit antenna arrays.

In some cases, the initiator may select at least one of the identified one or more transmit beamforming sectors and one of the identified transmit antenna arrays as a selection for communication with the wireless node. The at least one feedback frame may also have an indication of a receive signal quality associated with each of the transmit beamforming sectors. In some cases, the selection may be based on at least one of the receive signal qualities.

In some cases, the at least one feedback frame may also include a request for a receive beamforming refinement phase and, for each of the identified transmit beamforming sectors, one of the receive antenna arrays of the wireless node. Operations may further be provided for generating, in response to the request, at least one receive beamforming refinement frame comprising a preamble, a data field, at least one beamforming training field, and identification of the one of the receive antenna arrays included in the at least one feedback frame. Other operations may be provided for outputting the at least one receive beamforming refinement frame for transmission using at least one of the identified transmit beamforming sectors and at least one of the identified transmit antenna arrays.

In some cases, generating the at least one receive beamforming refinement frame may include determining a number of subfields to include in the at least one beamforming training field of the receive beamforming refinement frame based, at least in part, on whether the receive antenna array identified in the receive beamforming refinement frame differs from a current receive antenna array configured for the wireless node. It may further include generating the at least one beamforming training field to include the number of subfields.

In some cases, a first value of the status indication may indicate a transmit beamforming refinement frame is a last transmit beamforming refinement frame in the sector sweep for one of the receive antenna arrays but not the last transmit beamforming refinement frame in the sector sweep overall. Further, a second value of the status indication may indicate a transmit beamforming refinement frame is a last transmit beamforming refinement frame in the sector sweep overall. In one or more cases, operation may be provided to generate and output one or more data frames for transmission. For example, each data frame may be output for transmission between at least two transmit beamforming refinement frames.

Figure 11:
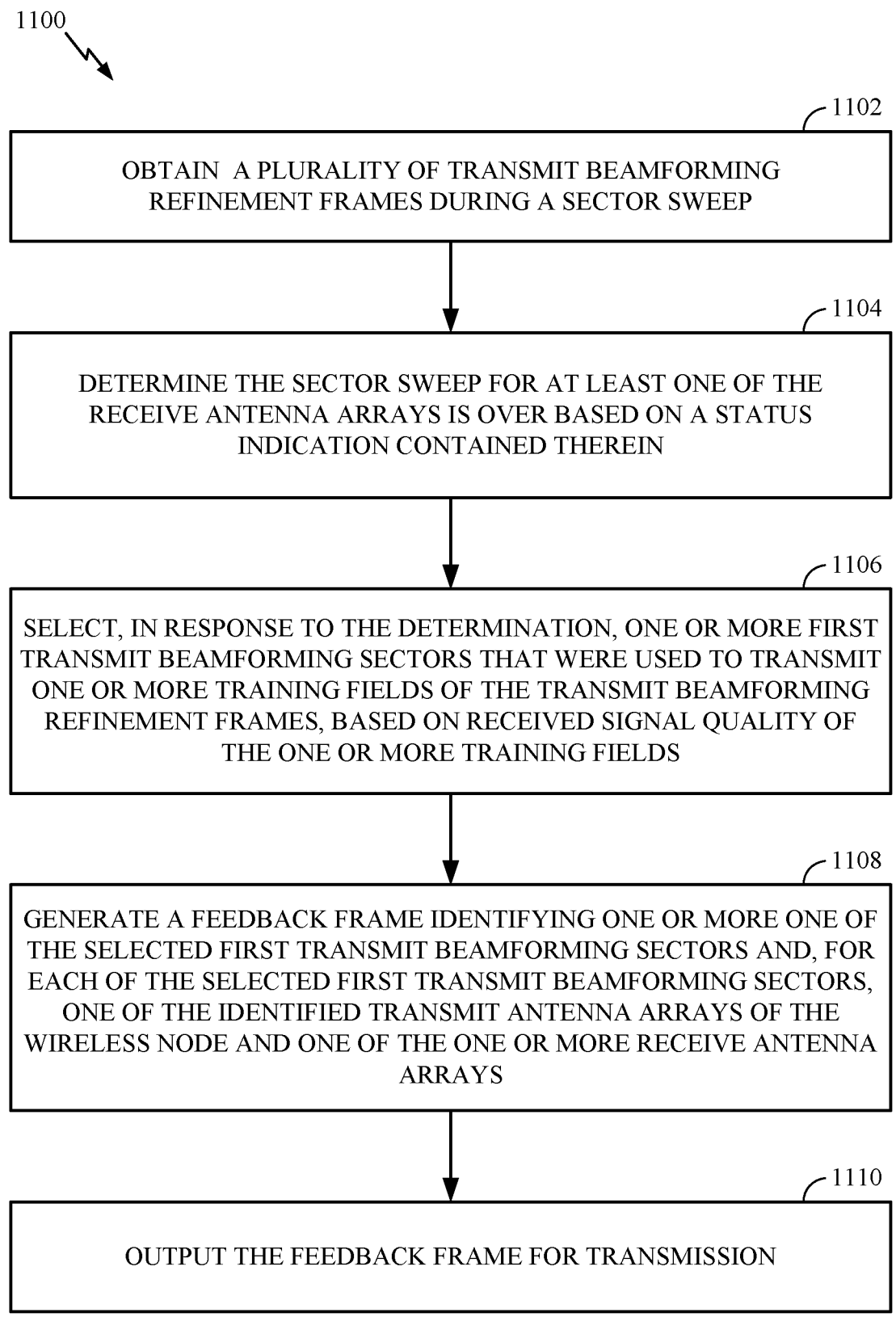
FIG. 11 illustrates example operations for performing beamforming training by a responder, in accordance with certain aspects of the present disclosure.
Figure 11A:
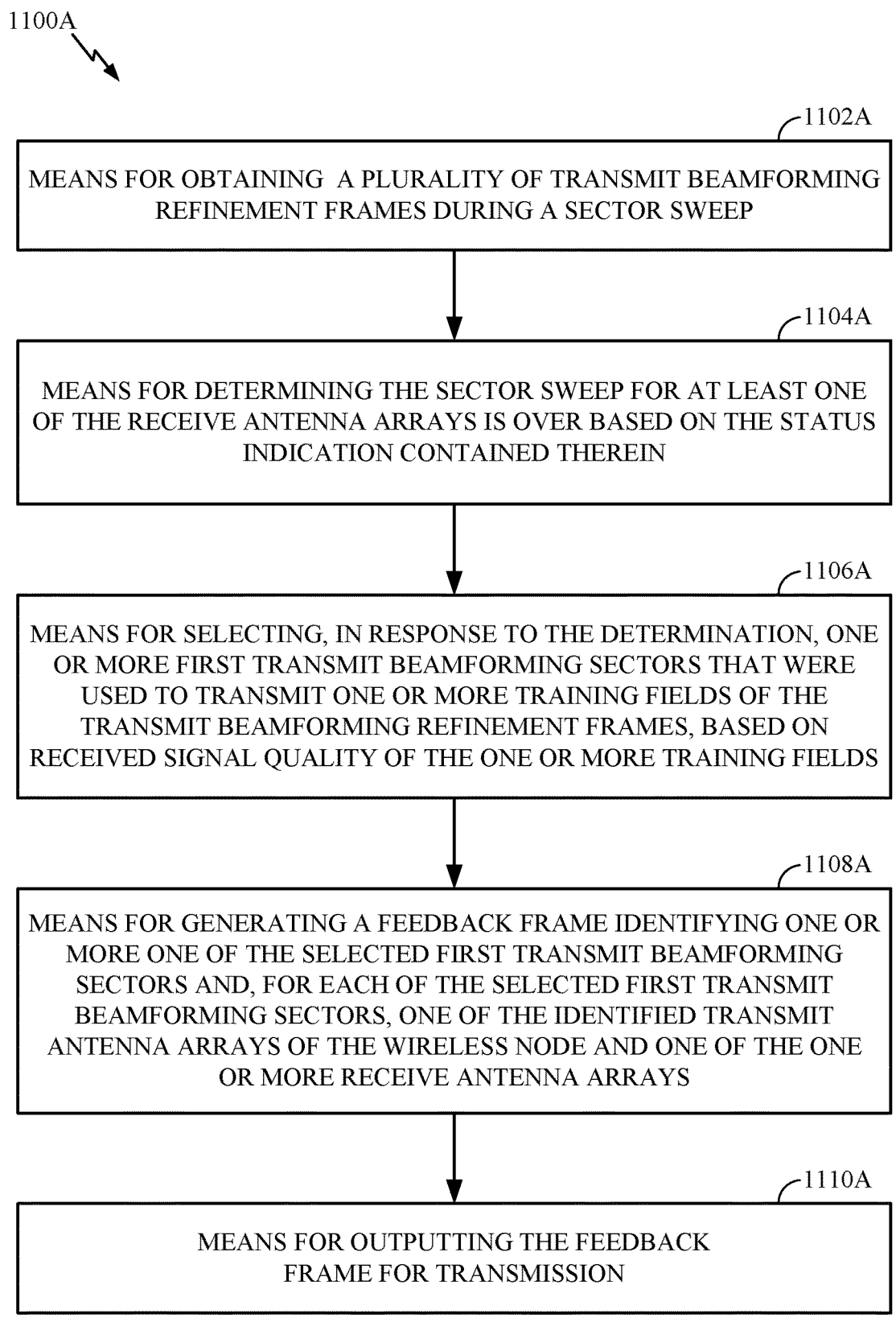
FIG. 11A illustrates example components capable of performing the operations shown in FIG. 11.

FIG. 11 illustrates example operations 1100 for performing beamforming training by a responder, in accordance with certain aspects of the present disclosure. In other words, operations 1100 may be performed by a responder (e.g., an AP or non-AP STA) performing beamforming training with an initiator performing operations 1000.

Operations 1100 begin, at 1102, by obtaining a plurality of transmit beamforming refinement frames during a sector sweep. At block 1104, the responder determines the sector sweep for at least one of the receive antenna arrays may be over based on the status indication comprised therein. At 1106, in response to the determination, the responder selects one or more first transmit beamforming sectors that were used to transmit one or more training field subfields, based on received signal quality of the one or more training field subfields. At 1108, the responder generates a feedback frame identifying one or more one of the selected first transmit beamforming sectors and, for each of the selected first transmit beamforming sectors, one of the identified transmit antenna arrays of the wireless node, and one of the receive antenna arrays. At 1110, the responder outputs the feedback frame for transmission using a second interface.

In some cases, the responder may obtain, in response to the request, at least one receive beamforming refinement frame comprising a preamble, a data field, at least one beamforming training field, and identification of a receive antenna array to be used by the apparatus to process the at least one beamforming training field to the responder may ignore one or more subfields of the at least one beamforming training field of the at least one receive beamforming refinement frame if the receive antenna array identified in the receive beamforming refinement frame differs from a current receive antenna array configured for the apparatus.

In some cases, each transmit beamforming refinement frame may have an indication of a first transmit beamforming sector used to transmit a subfield of a beamforming training field. to the responder may identify the selected one or more first transmit beamforming sectors based on the indication. In some cases, operations may be provided to obtain a last receive beamforming refinement frame in the receive beamforming refinement phase. Additionally, to the responder may generate an acknowledgement frame, after the last receive beamforming refinement frame in the receive beamforming refinement phase is obtained, and output the acknowledgement frame for transmission.

As described above, the SLS status indication may be conveyed as two bits, for example, indicating whether a BRP frame starts an SLS procedure, continues an SLS procedure, or may be the last BRP frame for an SLS procedure. In some cases, the indication may be that a BRP frame is the last BRP frame to be transmitted for a particular receive antenna array of the responder. In other words, the initiator may repeat the sweep for one or more other receive antenna arrays of the responder.

Figure 12:
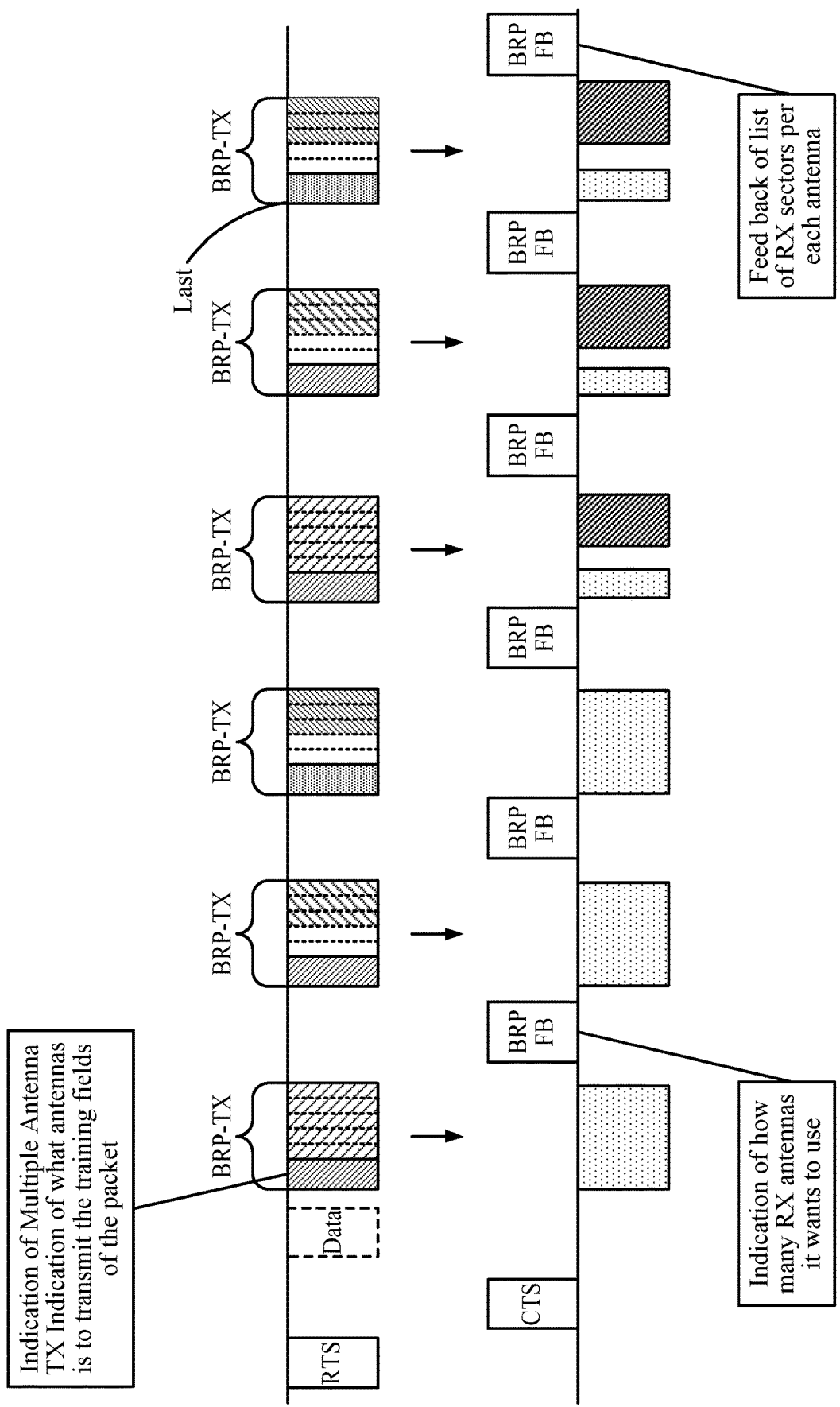
FIG. 12 illustrates an example beamforming training procedure, in accordance with certain aspects of the present disclosure.

FIG. 12 illustrates an example of beamforming training procedure 1200 in accordance with certain aspects of the present disclosure. As shown, an initiator may provide an indication that a BRP-based SLS procedure may be going to involve multiple transmit and/or receive antenna arrays. A shown, the sector sweet may be split over several BRP frames, with each BRP frame having training field transmitted with a different set of sectors and even different transmit antenna arrays.

As shown in FIG. 12, the protocol may start with a device (the initiator) indicating the beginning of the SLS based training in a BRP packet (start SLS state). The indication may be provided, for example, via a multi-bit SLS state field. As illustrated, a responder may indicate how many antennas the responder has, which an initiator may use to determine how many times to repeat a BRP-based SLS sweep.

The initiator responds by sending BRP TX training packets. As noted, each packet may include an indication of an SLS state (e.g., Start SLS, continue SLS, End of SLS per RX antenna and Total end of SLS), as well as an Antenna Id of the transmit antenna array used to transmit the training fields and a Sector ID of the first sector used to transmit the training fields, each training subfield may be transmitted using a different sector In some cases, each packet may have an indication in the PHY header that the TRN units are transmitted using a different antenna array from the preamble+data+header of the packet. The SLS indication in the header may indicate that the reception of the TRN part is through an Omni mode of a specific antenna array. Each packet may also include indication of whether SIFS response of the packet is requested, and if not feedback may be required.

If the training fields are transmitted using a different antenna array from the rest of the packet, the first and last TRN-units may be meaningless and may be used (only) for switching.

To each BRP-TX packet, the responder may respond with either and acknowledgement (ACK or BRP frame with no responses), or a list of the best received transmit sectors. Each response may include the following fields: a Transmit antenna Id, a Transmit Sector Id (the Sector Id transmitted in the beginning of the packet+the index of the TRN subfield within the packet), a Receive Antenna Id and, in some case, a Receive Quality Indication (e.g., SNR, RSSI, or EVM).

Data transmissions may happen between packet and acknowledgement pairs (such data transmissions are not shown in the figures). All data transmissions and the preamble+header+data of each BRP packet may be done using the best know TX antenna and sector configuration (e.g., from a previous training).

The number of packets per each transmit antenna may be different (e.g., different transmit antennas may have different number of sectors). Each transmit antenna transmission, however, may span several BRP packets. Further, the initiator repeats its transmission of all antennas and TX sectors for each of the responder receive antenna arrays.

At the end of each transmission set of all TX antennas, the initiator may indicate that this packet is the last per responder RX antenna. This indicates that from this packet on, the responder may receive the TRN part of the packet using a different antenna. In this case the initiator may append two extra TRN fields, at the beginning and end of the packet for allowing time for antenna switching.

At the end of all the transmissions from all of the initiator TX antennas to all of the responder RX antennas, in the last BRP packet, the initiator may indicate that this is the last packet in the TX SLS (using the SLS state field). In this case, the responder may respond with a list of sectors and received qualities as defined above. The response may not be immediate SIFS response, in which case the responder responds with an empty acknowledgement, and the initiator solicits the list using an empty BRP packet after some data transmission. The responder may also indicate how many TRN-units the responder may use per TX sector in the RX training.

In some cases, if the packet is not the last BRP packet in the TX SLS training, the packet may comprise an indication that SIFS response is expected. Further, a Tx Turnaround bit in the header may be set. In this case the response may be either an ACK or BRP packet with no requests. According to one or more cases, the data part of the BRP packet may be converted from management action no-ACK frame to a management action acknowledgement frame (ACK frame). In this case the response may be only ACK.

Figure 13:
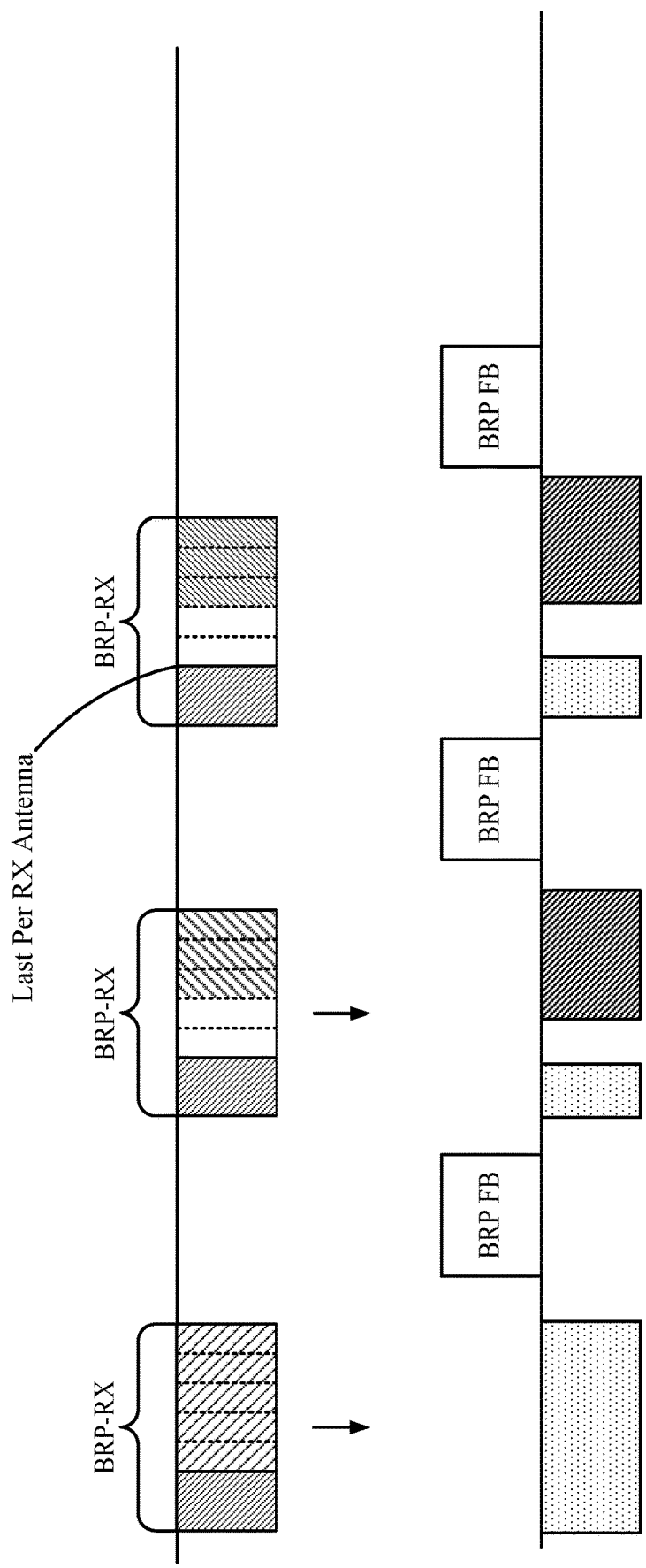
FIG. 13 illustrates an example beamforming training procedure in accordance with certain aspects of the present disclosure.

Receive beamforming training may follow the transmit beamforming training. For example, as illustrated in FIG. 13, the initiator may transmit, for each of its transmit antenna arrays to each of the responder receiver antenna arrays, using the sector(s) that were indicated as being received in the list of sectors (fed back). In some cases, only a single packet may be used, which may be transmitted using the transmit sector with best quality and the received sector with the best quality. Each BRP-RX packet may include an indication of which responder RX antenna array may be the target. If this indicated RX antenna array is not the current RX antenna array configured for the responder, the number of TRN units may be increased to allow for RX antenna switching.

While not shown in FIG. 13, data packets may be transmitted between the training packets. In the last training packet there may be another BF indicating which TX Sectors were received with which quality. The training may stop here if replacing the current configuration is not required.

If replacing the current configuration is desired, training of the reciprocal link may be provided. This training may be done by the responder and initiator switching roles, but the responder may only transmit BRP frames from the antenna array that it indicated as having the best RX, and the initiator may receive from the antenna that was found to have the best transmission. Only when this process ends, the link for data packets transmission may be switched (to new antenna/sector configuration based on the training).

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 400 illustrated in FIG. 4, and operations 500 illustrated in FIG. 5, correspond to means 400A illustrated in FIG. 4A, means 500A illustrated in FIG. 5A, respectively.

For example, means for transmitting, or means for outputting, may comprise a transmitter (e.g., the transmitter unit of the transceiver 222) and/or an antenna(s) 224 of the access point 110 or the transmitter unit 254 and/or antenna(s) 252 of the user terminal 120 illustrated in FIG. 2. Means for receiving, or means for obtaining, may comprise a receiver (e.g., the receiver unit of the transceiver 222) and/or an antenna(s) 224 of the access point 110 or the receiver unit 254 and/or antenna(s) 254 of the user terminal 120 illustrated in FIG. 2. Means for generating, means for identifying, means for selecting, means for including, means for determining, means for communicating, means for indicating, and means for ignoring may comprise a processing system, which may include one or more processors, such as the RX data processor 242, the TX data processor 210, the TX spatial processor 220, and/or the controller 230 of the access point 110 or the RX data processor 270, the TX data processor 288, the TX spatial processor 290, and/or the controller 280 of the user terminal 120 illustrated in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as combinations that include multiples of one or more members (aa, bb, and/or cc).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods described herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1); a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
   at least one processor configured to:
      generate a plurality of transmit beamforming refinement frames for a transmit sector sweep, wherein each transmit beamforming refinement frame includes a preamble, a data field, at least one beamforming training field, an identification of a transmit antenna array to be used for transmitting the at least one beamforming training field, a first status indication of whether the transmit beamforming refinement frame is a last transmit beamforming refinement frame in the transmit sector sweep for a receive antenna array of one or more receive antenna arrays of a wireless node, and a second status indication of whether the transmit beamforming refinement frame is a last transmit beamforming refinement frame in the transmit sector sweep in total; and
      output the plurality of transmit beamforming refinement frames for transmission; and
   a memory coupled with the at least one processor.

2. The apparatus of claim 1, wherein:
   the at least one processor is further configured to obtain at least one feedback frame from the wireless node, after the last transmit beamforming refinement frame in the transmit sector sweep for at least one of the one or more receive antenna arrays of the wireless node was output for transmission, the at least one feedback frame identifying one or more transmit beamforming sectors that were used for transmitting beamforming training fields of the transmit beamforming refinement frames and, for each of the identified one or more transmit beamforming sectors, one of the identified transmit antenna arrays; and
   the at least one processor is further configured to select at least one of the identified one or more transmit beamforming sectors and one of the identified transmit antenna arrays as a selection for communication with the wireless node.

3. The apparatus of claim 2, wherein:
   the at least one feedback frame also has an indication of a receive signal quality associated with each of the identified one or more transmit beamforming sectors; and
   the selection is based on at least one of the receive signal qualities.

4. The apparatus of claim 2, wherein:
   the at least one feedback frame also includes a request for a receive beamforming refinement phase and, for each of the identified one or more transmit beamforming sectors, one of the one or more receive antenna arrays of the wireless node; and
   the at least one processor is further configured to:
      generate, in response to the request, at least one receive beamforming refinement frame comprising a preamble, a data field, at least one beamforming training field, and identification of the one of the one or more receive antenna arrays included in the at least one feedback frame; and
      output the at least one receive beamforming refinement frame for transmission using at least one of the identified one or more transmit beamforming sectors and at least one of the identified transmit antenna arrays.

5. The apparatus of claim 4, wherein generating the at least one receive beamforming refinement frame comprises:
   determining a number of subfields to include in the at least one beamforming training field of the receive beamforming refinement frame based, at least in part, on whether the receive antenna array identified in the receive beamforming refinement frame differs from a current receive antenna array configured for the wireless node; and
   generating the at least one beamforming training field to include the number of subfields.

6. The apparatus of claim 4, wherein the at least one processor is further configured to:
   obtain an acknowledgement frame from the wireless node, after a last receive beamforming refinement frame in the receive beamforming refinement phase is output for transmission; and
   communicate with the wireless node using one of the transmit beamforming sectors indicated in the at least one feedback frame after obtaining the acknowledgement frame.

7. The apparatus of claim 4, wherein the at least one processor is further configured to:
   obtain an acknowledgement frame from the wireless node after a last of the at least one receive beamforming refinement frame was output for transmission, the acknowledgement frame indicating the wireless node does not request an additional receive beamforming refinement phase; and
   communicate with the wireless node using one of the transmit beamforming sectors indicated in the at least one feedback frame after obtaining the acknowledgement frame.

8. The apparatus of claim 1, wherein each transmit beamforming refinement frame has an indication of a transmit beamforming sector to be used to transmit a first subfield of the at least one beamforming training field.

9. The apparatus of claim 1, wherein the at least one processor is further configured to:
generate one or more data frames; and
output the one or more data frames for transmission, wherein each data frame is output for transmission between at least two of the transmit beamforming refinement frames.

10. An apparatus for wireless communications, comprising:
at least one processor configured to:
obtain a plurality of transmit beamforming refinement frames during a sector sweep, wherein:
each transmit beamforming refinement frame includes:
a training field;
an identification of a transmit antenna array used by a wireless node for transmitting the training field;
a first status indication of whether the transmit beamforming refinement frame is a last transmit beamforming refinement frame in the sector sweep for a receive antenna array of one or more receive antenna arrays; and
a second status indication of whether the transmit beamforming refinement frame is a last transmit beamforming refinement frame in the transmit sector sweep in total; and
determine the sector sweep for at least one of the one or more receive antenna arrays is over based on the first status indication contained therein;
select, in response to the determination, one or more first transmit beamforming sectors that were used to transmit one or more training fields of the transmit beamforming refinement frames, based on received signal quality of the one or more training fields,
generate a feedback frame identifying:
the selected one or more first transmit beamforming sectors; and
for each of the selected one or more first transmit beamforming sectors, one of the identified transmit antenna arrays of the wireless node and one of the one or more receive antenna arrays; and
output the feedback frame for transmission.

11. The apparatus of claim 10, wherein:
the feedback frame also includes a request for a receive beamforming refinement phase.

12. The apparatus of claim 11, wherein the at least one processor is further configured to:
obtain, in response to the request, at least one receive beamforming refinement frame comprising a preamble, a data field, at least one beamforming training field, and identification of a receive antenna array to be used by the apparatus to process the at least one beamforming training field; and
ignore one or more subfields of the at least one beamforming training field of the at least one receive beamforming refinement frame if the receive antenna array identified in the receive beamforming refinement frame differs from a current receive antenna array configured for the apparatus.

13. The apparatus of claim 11, wherein the at least one processor is further configured to:
obtain a last receive beamforming refinement frame in the receive beamforming refinement phase;
generate an acknowledgement frame, after the last receive beamforming refinement frame in the receive beamforming refinement phase is obtained; and
output the acknowledgement frame for transmission.

14. The apparatus of claim 10, wherein:
each transmit beamforming refinement frame has an indication of a first transmit beamforming sector used to transmit a subfield of a beamforming training field; and
the at least one processor is further configured to identify the selected one or more first transmit beamforming sectors based on the indication.

15. The apparatus of claim 10, further comprising at least one antenna via which the transmit beamforming refinement frames are obtained and via which the feedback frame is output for transmission, wherein the apparatus is configured as a wireless station.

16. A wireless station, comprising:
at least one processor configured to generate a plurality of transmit beamforming refinement frames for a transmit sector sweep, wherein each transmit beamforming refinement frame comprising a preamble, a data field, at least one beamforming training field, an identification of a transmit antenna array to be used for transmitting the at least one beamforming training field, and a first status indication of whether the transmit beamforming refinement frame is a last transmit beamforming refinement frame in the transmit sector sweep for a receive antenna array of one or more receive antenna arrays of a wireless node, and a second status indication of whether the transmit beamforming refinement frame is a last transmit beamforming refinement frame in the transmit sector sweep in total; and
a transmitter configured to transmit the plurality of transmit beamforming refinement frames.

* * * * *